US008185466B2

(12) United States Patent
Martinez et al.

(10) Patent No.: US 8,185,466 B2
(45) Date of Patent: May 22, 2012

(54) SYSTEM AND METHOD FOR SECURITIES BORROWING AND LENDING

(75) Inventors: John Martinez, Kensington, CA (US); Judith Robertson, Toronto (CA); Brian Lamb, New York, NY (US); Jamie Solomon, Wilder, KY (US); Jeff Mehlman, North Andover, MA (US); Michael A. Vardas, Burr Ridge, IL (US); Sandra Linn, LaGrange, IL (US); Bill O'Meara, Chicago, IL (US); Pat Cestaro, Muttontown, NY (US); Kurtis Kreider, Eldred, NY (US); Ramaz Ashurov, Brooklyn, NY (US); Gary Klahr, West Orange, NJ (US); Andrew Monkhouse, Orpington (GB); Igor Modlin, Jersey City, NJ (US); Keith Babitt, Scarsdale, NY (US); George Payne, Hoboken, NJ (US); Anthony Strazza, Staten Island, NY (US); Christine Doria, Rye Brook, NY (US); John McKenzie, Cranbury, NJ (US); Anthony Schiavo, Holmdel, NJ (US); Michael Robertson, Cortlandt Manor, NY (US); Brian McLoone, Marshfield, MA (US); Graham Sida, Cohasset, MA (US); Leigh A. Weston, Sharon, MA (US); Marcus Butt, Zollikon (CH); Ian Strafford-Taylor, London (GB); Andy Kollegger, Melen (CH); Dirk Pruis, Grand Rapids, MI (US)

(73) Assignee: Equilend Holdings LLC, New York, NY (US)

( * ) Notice: Subject to any disclaimer, the term of this patent is extended or adjusted under 35 U.S.C. 154(b) by 1146 days.

(21) Appl. No.: 10/461,866

(22) Filed: Jun. 16, 2003

(65) Prior Publication Data

US 2008/0052214 A1 Feb. 28, 2008

Related U.S. Application Data

(60) Provisional application No. 60/389,556, filed on Jun. 17, 2002.

(51) Int. Cl.
*G06Q 40/00* (2006.01)
(52) U.S. Cl. ....................................................... 705/37
(58) Field of Classification Search ...................... 705/37
See application file for complete search history.

(56) References Cited

U.S. PATENT DOCUMENTS

| 3,573,747 | A | | 4/1971 | Adams et al. | |
|---|---|---|---|---|---|
| 5,285,383 | A | * | 2/1994 | Lindsey et al. | ................. 705/26 |
| 6,018,721 | A | * | 1/2000 | Aziz et al. | ................... 705/36 R |
| 2001/0037284 | A1 | * | 11/2001 | Finkelstein et al. | ............ 705/37 |
| 2002/0029188 | A1 | * | 3/2002 | Schmid | ........................... 705/38 |

FOREIGN PATENT DOCUMENTS

WO WO-02/007041 1/2002

OTHER PUBLICATIONS

Build Your Portfolio But Avoid Large Fees Through Foliofn, Investors Can Buy 150 Stocks and the Tab Only Comes to $295 a Year.; [Metro Edition] Miriam Hill, Philadelphia Inquirer. Orlando Sentinel. Orlando, Fla.: Sep. 3, 2000. p. H.1.*

(Continued)

*Primary Examiner* — Lindsay M. Maguire
(74) *Attorney, Agent, or Firm* — Mayer Brown LLP

(57) ABSTRACT

Disclosed is a an electronic system for equities securities lending and financing. In particular, the disclosed system provides a hub for electronic financial transactions such as securities borrowing and lending and facilitates the ability of borrowers and lenders to locate suitable counterparties and engage in direct negotiations in a securities lending transaction.

12 Claims, 12 Drawing Sheets

OTHER PUBLICATIONS

Securities Lending Transactions: Market Development and Implications. Jul. 1999. Technical Committee of the International Organization of Securities Commission.*

GB Search Report dated Jun. 4, 2004, directed to counterpart GB application No. 0407841.

* cited by examiner

SYSTEM AND METHOD FOR SECURITIES BORROWING AND LENDING

CROSS-REFERENCE TO RELATED APPLICATIONS

This applications claims priority to U.S. Provisional application Ser. No. 60/389,556 filed Jun. 17, 2002, which is hereby incorporated by reference in its entirety.

TECHNICAL FIELD OF THE INVENTION

The present invention relates to an electronic system to facilitate securities lending transactions for borrowers, sellers, and related parties. By providing a central hub through which interested parties can easily locate suitable counterparties and book transactions, this invention avoids the time-consuming and labor-intensive process of matching borrowers and lenders. The invention is characterized, at least in part, by the architecture and design of a standards-based, open, and secure global securities lending platform, or hub, and more particularly to the methodologies in the initiation, processing, settlement of transactions and related back-office operations that such a platform provides for its participants.

BACKGROUND OF THE INVENTION

In today's capital markets, securities seldom lie idle. If not being bought and sold in outright market transactions, securities are frequently lent to parties wanting to borrow them, or used as collateral to raise short-term finance. These transactions include repurchase agreements, securities loans and sell-buyback agreements. While they differ in detail, they nonetheless have many similarities. This family of transactions is generically described as "securities lending".

Securities lending transactions generally involve the simultaneous or near-simultaneous transfer of securities for collateral. Significant securities lenders include entities such as banks, investment managers, pension funds, mutual fund complexes, endowment funds, and insurance companies. Lenders often lend securities to supplement or earn incremental income on their portfolio holdings. Borrowers are generally broker/dealers and banks. Borrowers often borrow securities to facilitate trade settlements, and to support both proprietary and customer trading strategies.

Participants in securities borrowing and lending transactions can be further sub-classified into: Beneficial Owners; Agent Lenders; Broker/Dealers; and External Customers. Beneficial Owners are the true owners of securities. Agent Lenders are often banks that custody the shares of the beneficial owners and represent the beneficial owners in securities lending transaction. Agent lenders often represent more than one beneficial owner, thus creating an aggregate pool of securities to lend. Agent lenders generally provide administrative services to the beneficial owners such as reporting, corporate actions monitoring, collateral management, and billing. Broker/Dealers often have securities borrowing and lending trading desks that coordinate the borrowing of securities from lenders to cover customer and proprietary trading needs such as arbitraging, hedging and short selling. Broker/dealers may also borrow securities to settle transactions that are failing, or to lend them to other broker/dealers.

Securities lending has become a central part of securities market activity in recent years, to a point where the daily volume of securities transactions for financing purposes considerably exceeds that of outright purchase and sale transactions. Securities lending involves the temporary exchange of securities, usually for other securities or cash of an equivalent value (or occasionally a mixture of cash and securities), with an obligation to redeliver a like quantity of the same securities at a future date. Most securities lending is structured to give the borrower legal title to the securities for the life of the transaction, even though, economically, the terms are more akin to a loan. The borrow fee is generally agreed in advance and the lender has contractual rights similar to beneficial ownership of the securities, with rights to receive the equivalent of all interest payments or dividends and to have equivalent securities returned. The importance of the transfer of legal title is twofold. First, it allows the borrower to deliver the securities onward, for example in another securities loan or to settle an outright trade. Second, it means that the lender usually receives value in exchange for the disposition of legal title (whether in cash or securities), which ensures that the loan is collateralized.

In a typical securities lending transaction, a stock or bond is exchanged for collateral between a lender and a borrower for temporary use. Generally, the lender through its lending agent delivers a security to an approved borrower in return for collateral, usually in the form of cash, U.S. Government securities, letters of credit, or other selective forms of non-cash collateral. In most instances, the borrower is a broker/dealer who uses the securities to meet an array of short-term needs, including: avoiding settlement failures, supporting hedging-short selling strategies, and to facilitate arbitrage opportunities.

Collateral is a key element in a securities lending transaction. For use of a security, a borrower provides collateral to the lending agent to secure the borrower's promise to return the security within an agreed upon timeframe. Generally, the collateral requirement for domestic loans is 102% and 105% for international loans. The excess collateral serves as a safe-guard against counterparty credit risk in the event of a borrower default, which could necessitate the collateral being liquidated and repurchasing the loaned security. Monitoring the collateral adequacy, known as performing a "mark to market," occurs daily. Should the collateral fall below 100% of its market value, additional collateral is requested from the borrower to restore the value to its appropriate level.

The lending agent agrees to pay interest, known as the rebate, to the borrower for the use of the cash collateral. The amount of the rebate reflects the intrinsic value of the loaned security-keeping in mind that some securities are more highly sought after than others. The higher the demand is for the security, the lower the rebate that will need to be paid. The cash collateral is then invested by the lending agent in accordance with the lender's investment guidelines. The goal is to earn a higher yield on the reinvestment of cash collateral than the rebate promised to the borrower. The earnings generated above and beyond the rebate amount, referred to as the "spread," represents the profit in the transaction. In a non-cash collateralized lending transaction, the borrower and lender negotiate a premium (or a flat fee) to be paid in place of the rebate.

Currently, there are two primary ways in which the securities lending operations are transacted. First, manual transactions are done by traders and other personnel of lending and borrowing entities communicating by traditional avenues such as phone, fax or email. This process is inherently ineffective and prone to human and other errors which result in the creation of inconsistent data or other discrepancies or even in failed trades. Second, point-to-point connections permit an entity that intends to either borrow or lend securities to set up a connection with a counterparty and communicate with that party using a pre-determined protocol. This will result in a plethora of protocols and sometimes even technology platforms and infrastructures that a firm ends up building and supporting. This creates a technology environment that is very expensive and cumbersome to maintain, eventually working to the detriment of the organization in most cases.

Due to the aforementioned peculiarities of securities lending transactions, present electronic systems for carrying out securities and commodity trades have proven inadequate. One such system used, for example, for over-the-counter trades is the Instinet system, as is described in U.S. Pat. No. 3,573,747. The Instinet system includes a series of terminals, each accessible to a member and a central computer. Each member may submit for display a firm offer to buy or sell a given number of shares of a certain security at a stated price. The member may also submit bids or offers of a security without price. This information, minus the submitter's identity, is displayed to all members, in a price sequence. Any member may respond to an offer through the negotiating option of a counteroffer and the system will allow private communications between the two members until and if an agreed upon price is reached. Alternatively, a member may submit an acceptance of any offer displayed to all members. In either option, the system executes orders when a buyer and seller have agreed upon a price. The parties to an executed trade deliver the shares of stock and purchase price to a designated bank for a conventional clearing operation. If a bid and an ask are submitted at the same price, the system will consummate the trade.

The Instinet system is not designed to address the unique aspects of securities lending. The Instinet system does not provide potential borrowers or lenders the ability to transmit, in real-time, their availability and parameters for a desired transaction, making the process of matching amenable counterparties time-consuming and labor-intensive, especially when the parties reside in disparate geographic locations, due to time-zone differences. It would, therefore, be advantageous to provide a system that allows parties to broadcast availability messages in real-time, to facilitate the identification of suitable counterparties.

Unlike traditional securities transaction such as the sale/purchase of stocks, bonds, etc., stock loan transactions remain "open" after the initial transaction is completed, i.e., the loan of stock for use as collateral in a financial transaction. It is, therefore, desirable to have a system that would allow the users to program business rules into their own proprietary system to trigger the generation of autoborrow and availability messages, based on a set of parameters such as the positions or requirements of specific securities, to allow for the recall and return of loaned securities, mark-to-market comparisons, and other features specific to the field of stock loan (i.e., securities lending) transactions. As well, it would be desirable to have a system that operates using an open protocol, to allow system users to integrate their systems, whether proprietary or otherwise, into the system in real-time.

Further, it is desirable to have a system in which availability broadcasts could include the available party's desired transaction criteria. The system would, optimally, permit the available party to tailor the broadcast to include specific, desired transaction terms and enable the initiation of orders that targets all available counterparties using a single messaging protocol.

Moreover, as previously mentioned, prior art systems cannot adequately address the needs of those engaged in securities lending transactions. As opposed to outright sale and purchase of securities, a securities lending contract remains open for a significant period of time. Hence a system that intends to facilitate securities lending should store these transactions for a much longer period, than that is required for the regular trading of equities. The metrics associated with the loan contracts need to be periodically compared and reconciled (in the novel system described hereinafter, it is accomplished through contract compare, mark-to-market and billing compare). Accordingly, it is desirable to have system that facilitates securities lending that provides the 'recall' feature to the lenders to recall securities that they have lent and 'return' feature to it's borrowers to return the securities recalled.

BRIEF SUMMARY OF THE INVENTION

The invention relates to a system and method for facilitating securities lending transactions, comprising at least an application tier, a messaging tier and presentation tier. These tiers form a hub that may be in electronic communication with a public or proprietary distributed network and provide a centralized system for communication between securities trading firms, brokers, and other participants in a process for lending securities.

A member firm wishing to engage in a securities lending transaction may initiate a "firm request" indicating a desire to loan or borrow securities. The request is transmitted via the distributed network, via the hub, and is intercepted by the messaging tier. The messaging tier forwards the request to an application tier to validate the syntax of the message and/or process the request. Provided that the request includes a parameter for engaging in a securities lending transaction, the application tier may transmit the request back to the messaging tier for distribution to suitable counterparties.

As well, although many protocols for message transmission can be adapted for use with the present invention, the requests may be formatted in the extended markup language (XML) or the securities lending markup language (SLML).

DETAILED DESCRIPTION OF THE INVENTION

Figure 1:
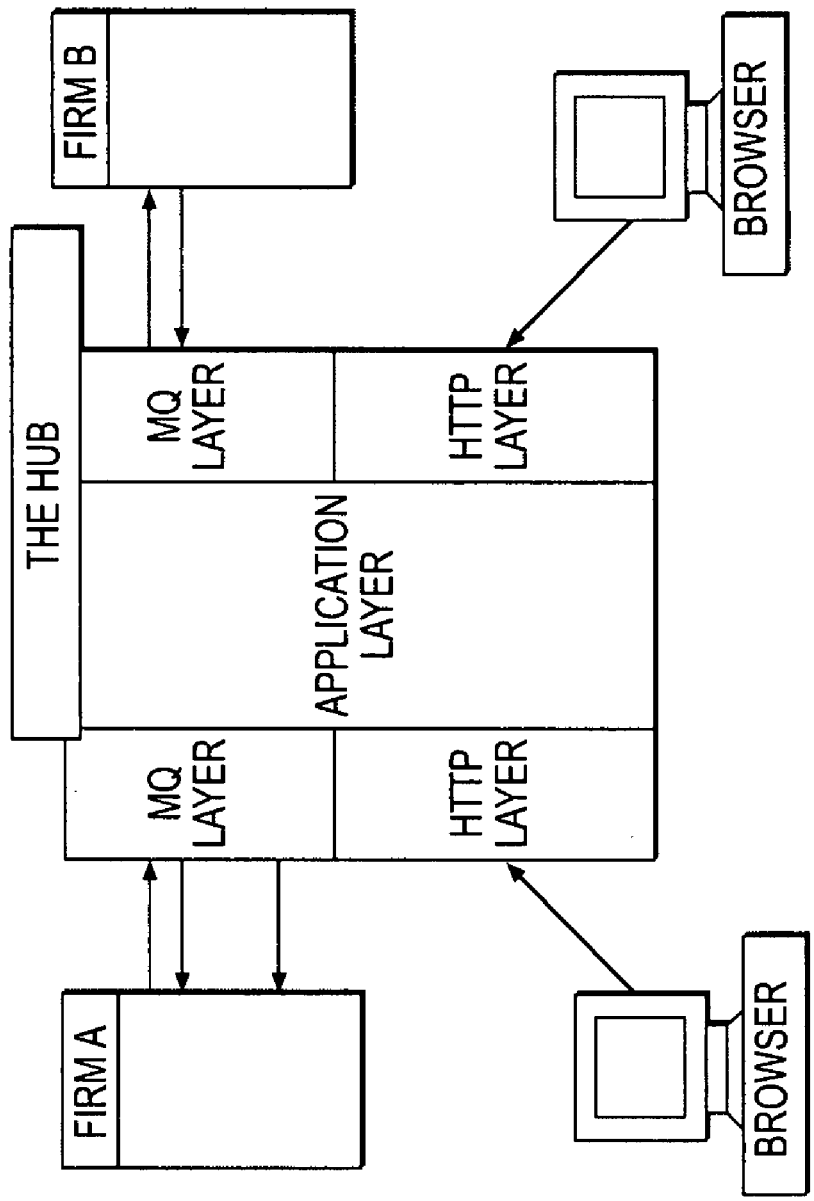
FIG. 1 shows an illustrative embodiment of the hub of the present invention.

The present system and method provides a global securities lending hub/platform to eliminate the inefficiencies associated with the current approach and to create and implement specific methodologies for the benefit of its participants. Specifically the proposed hub/platform model would provide the following business-related benefits: 1) automation of trading related operations that are traditionally done manually; 2) creation and implementation of specific methods of conducting those business processes that provide value (Chaining Rules etc.) and eliminate errors (Shared Trade Ticket, Uniform Ids across counterparties for a transaction); 3) reconciliation of the metrics associated with a transaction at periodic intervals with the proprietary systems of the parties; 4) the opportunity to increase transaction volume; 5) reduction, quick notification and resolution of errors; and 6) Standardization of pricing feeds and timing of trades.

Further, the present system allows for the elimination of redundant IT infrastructure, a uniform protocol (such as an XML-based protocol, called SLML which is herein) to communicate with all trading partners, a single open standards-based infrastructure to transact with all trading partners, ease of integration of their proprietary systems with the hub in real-time, the ability to define business rules which operate on the data in their proprietary systems and automatically initiate trades through the hub/platform, reduction of IT complexity and associated costs, and increased throughput with regard to the number of transactions in a given time period.

Other benefits to using the present system may include increased liquidity The single most important property of a successful securities market is the promotion of liquidity, i.e., the ability to trade investment positions quickly, efficiently, and with minimal market impact. Definitions of liquidity range beyond the ability to deploy capital into and out of a market in an "efficient" way. Efficiency, in this context, generally refers to a transaction that is carried out without excessive transaction costs or impact on securities prices. In a broader sense, liquidity refers to the ability of market participants to make money by trading when a market is moving downward as well when the market is trending upwards. Liquidity also relies on efficient price information and settlement systems, low transactions pricing and spreads, and low infrastructure and tax costs.

Certain securities lending activities provide a significant source of liquidity to a well developed capital market. By using the securities already outstanding in a market, securities lending has the effect of increasing the total supply of available assets. The trading and settlement features of the present invention facilitate the use of stock assets, in effect, to do "double duty" in the service of market liquidity by converting otherwise sterile holdings into a dynamic, internally-generated source of finance that can support higher trading volumes and more sophisticated trading strategies. By turning existing stocks and bonds into financing sources for further transactions, a well-developed securities lending business can minimize trading friction, improve efficiency, reduce settlement fails and lower transaction costs across an entire capital market. Thus securities lending plays an important role in ensuring liquidity in a capital market.

The present system permits many parties in this business to be brought together onto an trading hub that provides the functionality to successfully lend, borrow securities and conduct other back office operations, all in real-time and with increased reliability. Members have access to a large pool of available securities and efficient means of lending and borrowing them. Further, the collection of various metrics in a data repository and the generation of benchmarks and statistics related to the securities lending industry, and the realignment and streamlining of trading and back-office processes to avail the methodologies available on the platform.

The system is characterized, at least in one embodiment, as a hub-based platform that provides a browser-based user interface. Although the system can be used over any local-area or distributed network, the internet can be used to avoid the expense of a proprietary transport network. This standards-based platform may use an XML-based protocol, such as SLML, to provide a symmetrical, non-biased system with equal capabilities for borrowers and lenders participating in securities lending transactions.

A preferred embodiment of the invention uses the Securities Lending Markup Language (SLML) to serve as the uniform protocol used to exchange messages between participant firms. SLML is based on XML (extended markup language), the popular open-standards language for complex data sharing between disparate applications. XML allows users to organize document elements (words, pictures, etc.) based on a structural hierarchy that can be easily exchanged over the World Wide Web. It is independent of any underlying programming language, transport mechanism, or messaging protocol and allows full flexibility.

SLML, like XML, is interoperable across platforms. SLML supports the seamless exchange of electronic data between and within institutions using diverse technology platforms. Using SLML and core XML-compatible technologies, securities lending data can be exchanged between applications within an individual firm and throughout the industry.

Further, SLML is STP-Oriented. Firms can benefit by improving the overall efficiency of the securities lending process as they seek to implement straight-through processing (STP) in order to reduce trade failures and shorten transaction processing cycles. With a standards-based architecture, the costs of implementation and upgrading to new technologies with SLML may be reduced. Each XML message is sent as asynchronously to perform a discrete operation, trading or otherwise, from the member to the Hub. The message will have a header section which will specify the recipient/s to which the message is intended to. The Hub application processes the message and sends one or more messages to the specified recipient and a confirmation message, if requested, is sent to the member who initiated the transaction.

The important thing to note is that in this model, the participant firms may send messages to the hub/platform and/or their trading partners. All operations including the initiation, negotiation, confirmation and rejection of trades, posting of available securities and the back-office comparison operations involve the exchange of messages between the platform and the member firms. A high-level overview illustrating one embodiment of the function of the hub and the communication which is handled by the hub is shown in FIG. 1.

Such a system can be best described as adhering to an "n-tier" architecture and thus consisting of a set of tiers that work with each other to fulfill the responsibilities of the system. For the purposes described here, a tier is a collection of one or more software components that provide a high-level technical function or feature (e.g. a database tier providing the ability to store, update and retrieve data). Another commonly used term to describe a set of components is a 'layer' and hence these two terms ('tier' and 'layer') are used interchangeably in this document.

The system includes a database tier that acts as the storage for all data, both static and dynamic, that is essential for the functioning of the platform. The data includes set-up data such as information about the members, their users, their relationships with other members and the agreements between them in relation to the various back office functions. It also includes highly dynamic data such as information about the various transactions, the parties, securities and other attributes of these transactions. This tier can be implemented using any Relational Database Management System (RDBMS) such as Oracle, Sybase and MS SQL Server.

The system also includes an Application Tier which is the implementation of the business rules necessary for the initiation, validation and execution of the securities lending transactions between the members. This tier consists of one or more modules that encapsulate the set of specific functions necessary to perform an action or satisfy a request related to each functional area (such as autoborrow or availability). Typically, these modules interpret a business request semantically to perform a series of steps which will result in the creation/update or retrieval of data from the database (by sending the appropriate requests to the database tier) and the creation of response messages that will be transmitted by the messaging tier. In that sense, this tier is the heart of the platform and acts as the interface to the business functionality to the other tiers. Both the presentation and messaging tiers use this tier to satisfy the requests originated by either the user actions in the browser or by an XML message sent by a member's proprietary system.

Figure 11:
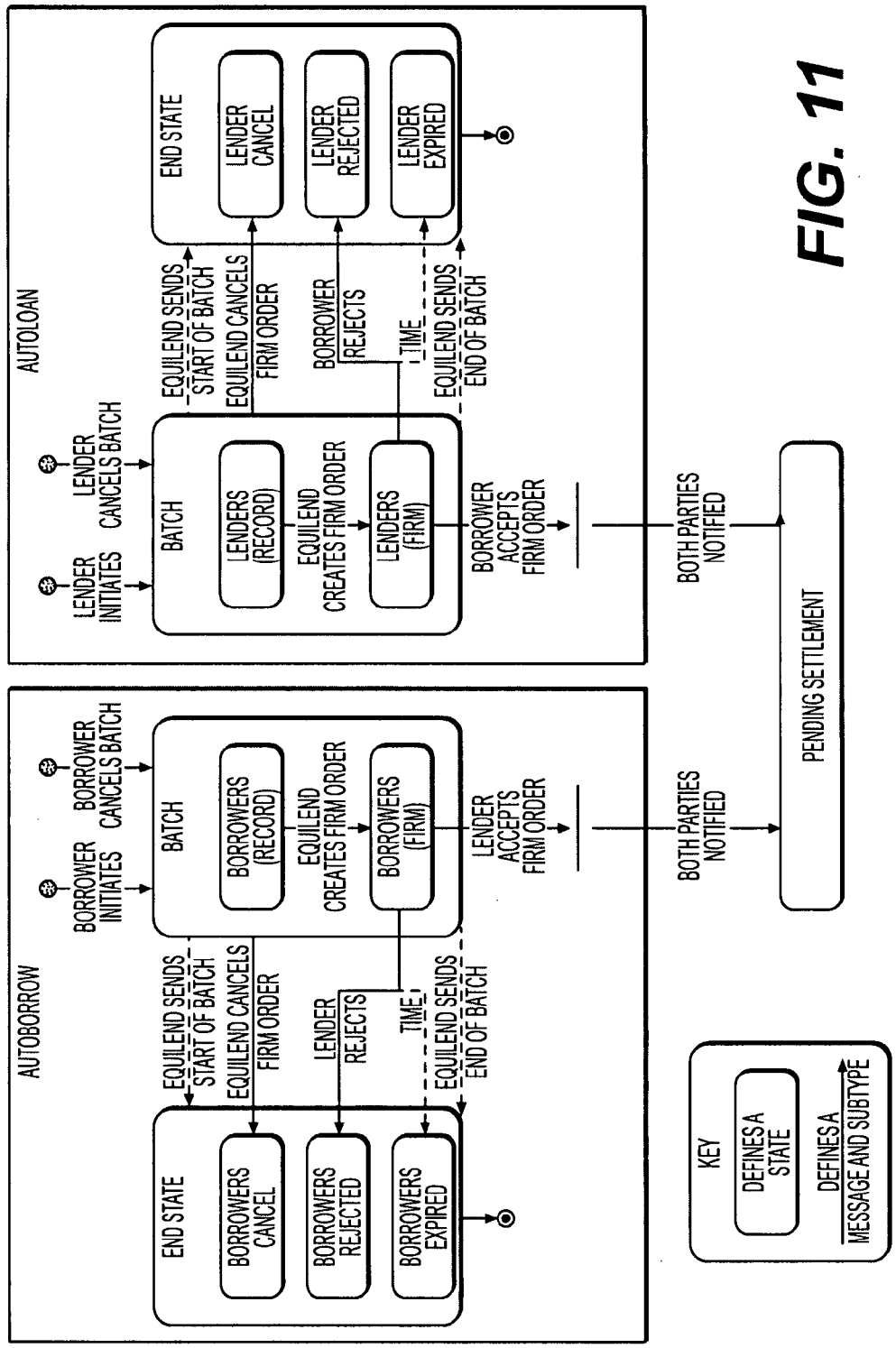
FIG. 11 shows an illustrative embodiment of the autoborrow feature of the present invention.
Figure 12:
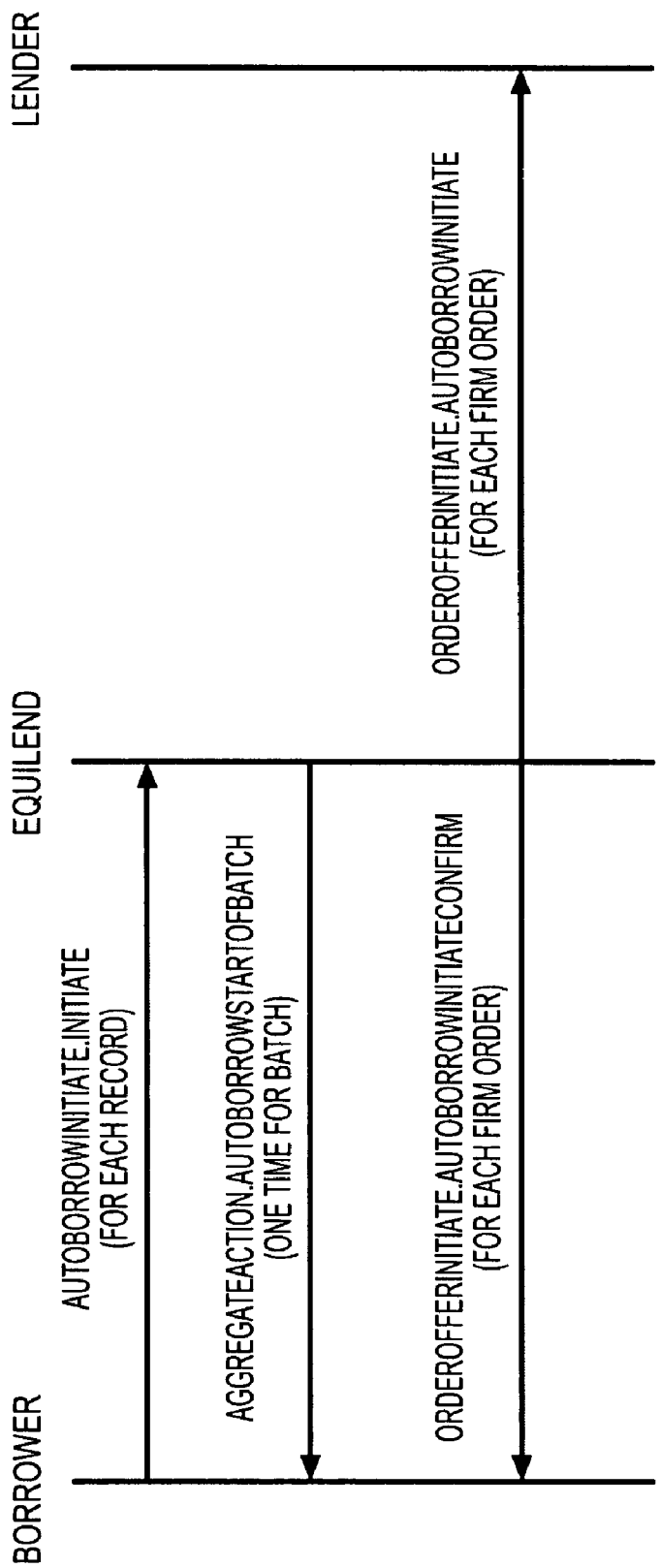
FIG. 12 shows an illustrative embodiment of the initiation of the autoborrow feature of the present invention.

A messaging tier acts as the hub's interface to the member's proprietary systems. Members conduct transactions with their counterparties by exchanging messages with the system platform. Each XML message has a type, subtype and data. The type and subtype indicate the business function (autoborrow, negotiation, contract-compare, login etc.) the message intends to perform and the data that is pertinent to that specific business function. These messages are sent to and received by entities known as 'queues'. Simply described, queues are objects that hold messages. A queue that is local to the program that is sending a message is known as a local queue and a remote queue is one which is located in a remote environment. In the case of the present system, there are a number of local queues to receive messages from the members, and a number of remote queues that actually point to local queues in the member's environment and which are used to send messages. The system's infrastructure guidelines specify a number of queues and the mechanism by which these queues need to be configured. In a simple configuration, there will be one queue per member per business function. For example for a given member organization there will be 'n' number of queues, where 'n' is the number of business functions that the system supports. Hence if a member B wants to send an autoborrow message to member A, the message would have to be sent to the queue that is designated to receive autoborrow messages for member A. If this message is sent to any other queue, it will be deemed an invalid message and sent back to the sender. In this case, the system would send a 'Reject' message to the queue. FIGS. 11 and 12 illustrate examples of the use of the autoborrow feature of the present invention and the initiation of the process.

The messaging tier acts as the interface that provides core messaging, both of sending and receiving XML messages, to and from the other tiers. The messaging tier receives XML messages, parses them and extracts valid values from various fields. It then determines the appropriate component in the application layer that handles this business process and interacts with that component to perform the necessary function. Conversely, the application tier uses the functionality provided by the messaging tier to construct valid XML messages and send them to the intended recipients.

Most business transactions supported by the system can potentially involve the retrieval and sending of multiple messages to and/or from multiple parties and, hence, this tier needs to be robust, reliable, and scalable. Any messaging product that supports the fast, secure, guaranteed and asynchronous delivery of XML messages can be used to implement this tier.

A typical scenario will help illustrate the interaction between the tiers and clarify the division of responsibilities between these tiers/layers. When a request for autoborrow is received from a member's proprietary system as a SLML document, the messaging layer retrieves the message from the queue, performs basic security checks on the message (username/password or a token associated with the message), determines whether the message originated from a valid member, and whether the message has been retrieved from the appropriate queue. The messaging layer then determines the appropriate component in the application layer that can handle this request and hands the request over to that component. The components in the application layer interpret the message functionally and thus determine the counterparties to whom this autoborrow request should be sent and calculates any other values that need to be filled in the response messages. The application layer then invokes the messaging layer to send a request to the designated counterparties. A similar sequence of actions takes place when the initial request originates from a user action through the browser, instead of a participating firm's proprietary system. In that case, the only thing that differs is the fact that the presentation tier intercepts the HTTP request instead of the messaging layer. It should be noted that in a preferred embodiment of the system, most real-time messages that need to be sent in bulk will originate from a member's proprietary system and thus will be intercepted by the messaging layer.

The presentation tier is the layer which deals with the user interaction portion of the application. The system's user interface is an easy to use web-based interface. Users can perform various business and related functions by navigating through the screens in their browser. Each such action results in one or more HTTP requests that are sent to the web server and eventually reach the presentation tier. The presentation tier intercepts requests made by the user through the web-browser, parses and validates them and works with the application layer to perform the function desired by the user. The present system supports browsers including Internet Explorer and Netscape. It is preferred that the most recent version of each browser is used. With Internet Explorer, it is preferred to use a version at least as recent as version 5.5.

The communication between the member firms and the hub are based on guidelines defining point-to-point interactions between member firms. Each member firm, however, can communicate with multiple member firms via the hub, and a member firm can receive and respond to multiple communication requests.

Since the communications system of the present invention may be based on an open-standard protocol, such as XML, member firms can use various commercial software packages for creating and handling their XML messages and responses. In an embodiment of the invention, member firms are responsible for building the actual XML messages (with correct syntax and inputs) and then sending the message to the hub, to initial an XML request. Member firms then use the XML response received from the hub in their interactions with their end-users. The member firms then aggregates data received from multiple XML requests or, when communicating with multiple firms through the hub, aggregates the data received from all responses. The member firm may then store the data for later use, such as for forwarding to an end-user.

The present system provides means for servicing XML requests received from member firms. These means, such as an MQ handler application (such as the MQ Series Middleware Application sold by IBM Corporation of Armonk, N.Y.), process accepted XML requests, construct appropriate XML responses, and send responses back to member firms. Incoming XML requests may also be validated by verifying the XML request syntax, input data, and access permissions before processing the request. When a request is received from a member firm that requires aggregation of data, the system may aggregate data from multiple sources (which may be located locally or anywhere on a distributed network which is in communication with the system) to provide the appropriate response.

Figure 2:
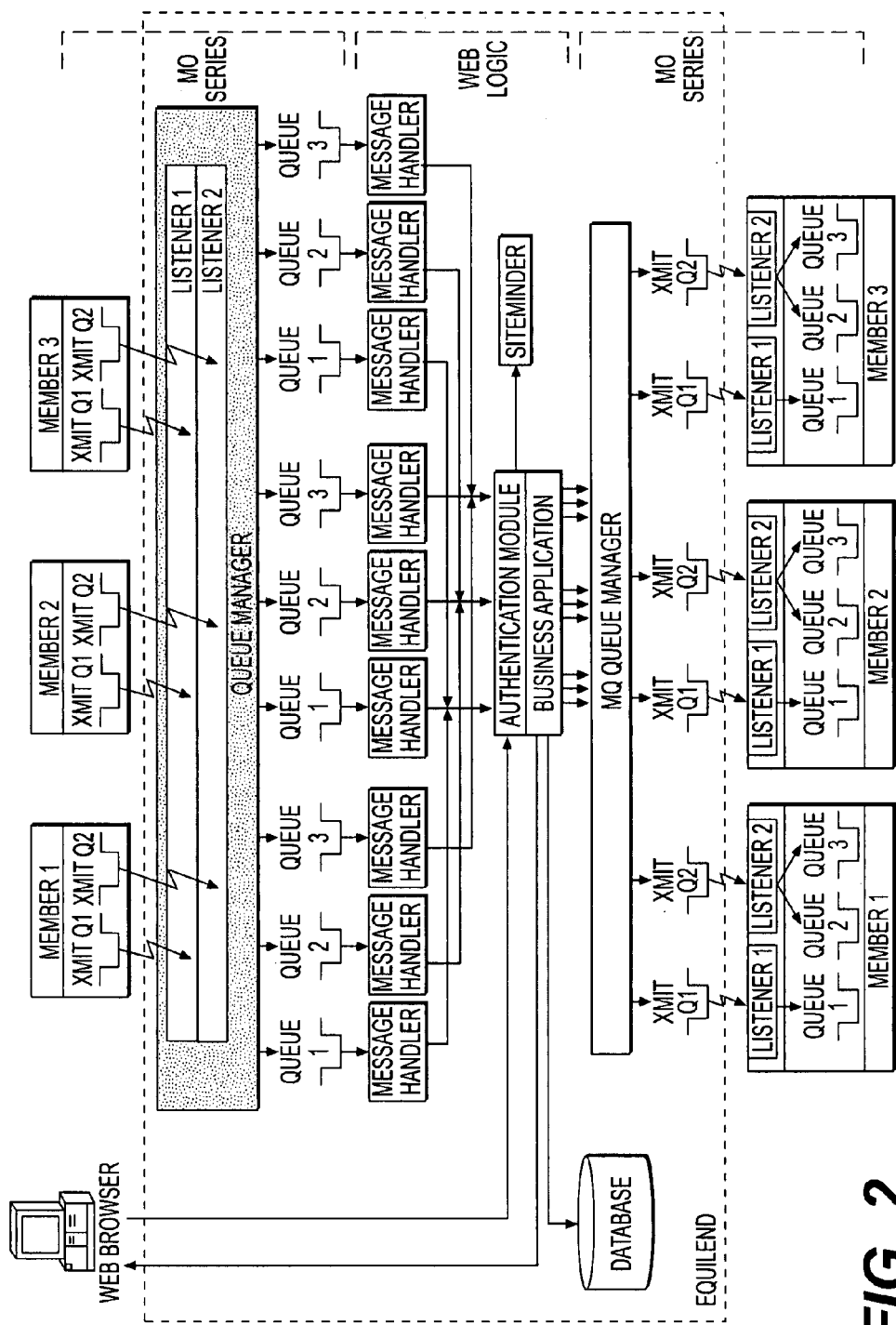
FIG. 2 shows an illustrative embodiment of message flow using two-channel transmission.

The message queue design of the present system supports the transmission different types of messages using a two-channel transmission from the member firm's queue manager to the system message queue manager and back. This type of system may separate high-priority messages from bulk data transmission and is illustrated in FIG. 2.

Figure 3:
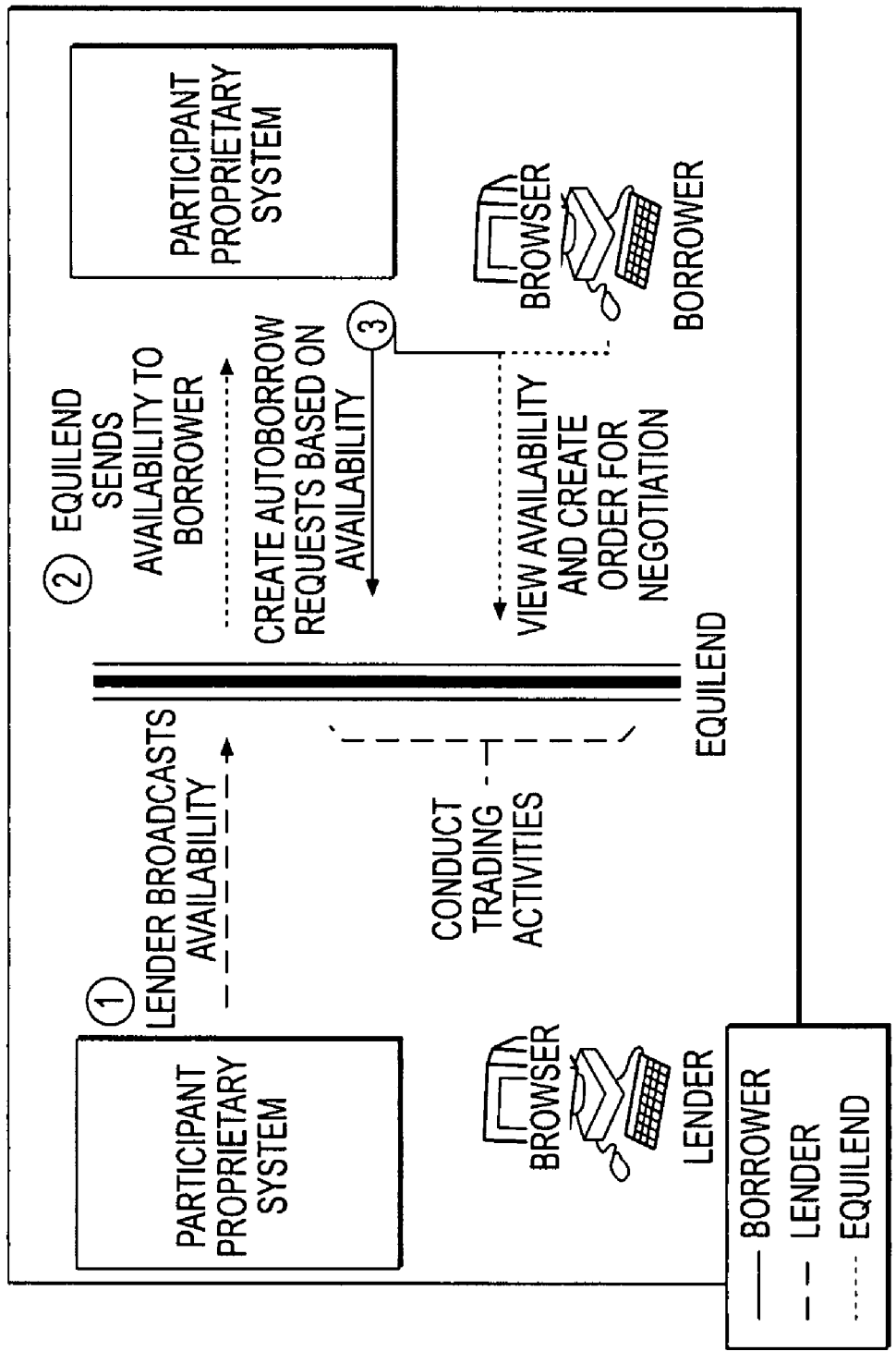
FIG. 3 shows an illustrative embodiment of a participating lender making an availability broadcast.

The messages sent between the member firms and the system hub permit potential borrowers and lenders to communicate and identify one another, as part of the process of beginning a securities lending transaction, as shown in FIG. 3. For example, a lender may wish to locate suitable counterparties. Using the present system, the lender sends an availability broadcast from their own proprietary system to the system hub or from a browser that includes software, applets, scripts, etc. for communicating with the system hub in an appropriate protocol. The availability broadcast may be tailored to include particular criteria set by the lender, such as the security they wish to lend, number of shares, financial terms, etc. The system hub can retransmit the availability broadcast to any or all member firms or browsers in communication with the hub. Borrowers who agree to the terms set forth in the availability broadcast may then choose to enter into a securities lending transaction with the lender or enter into negotiations over the terms of the securities loan.

Figure 4:
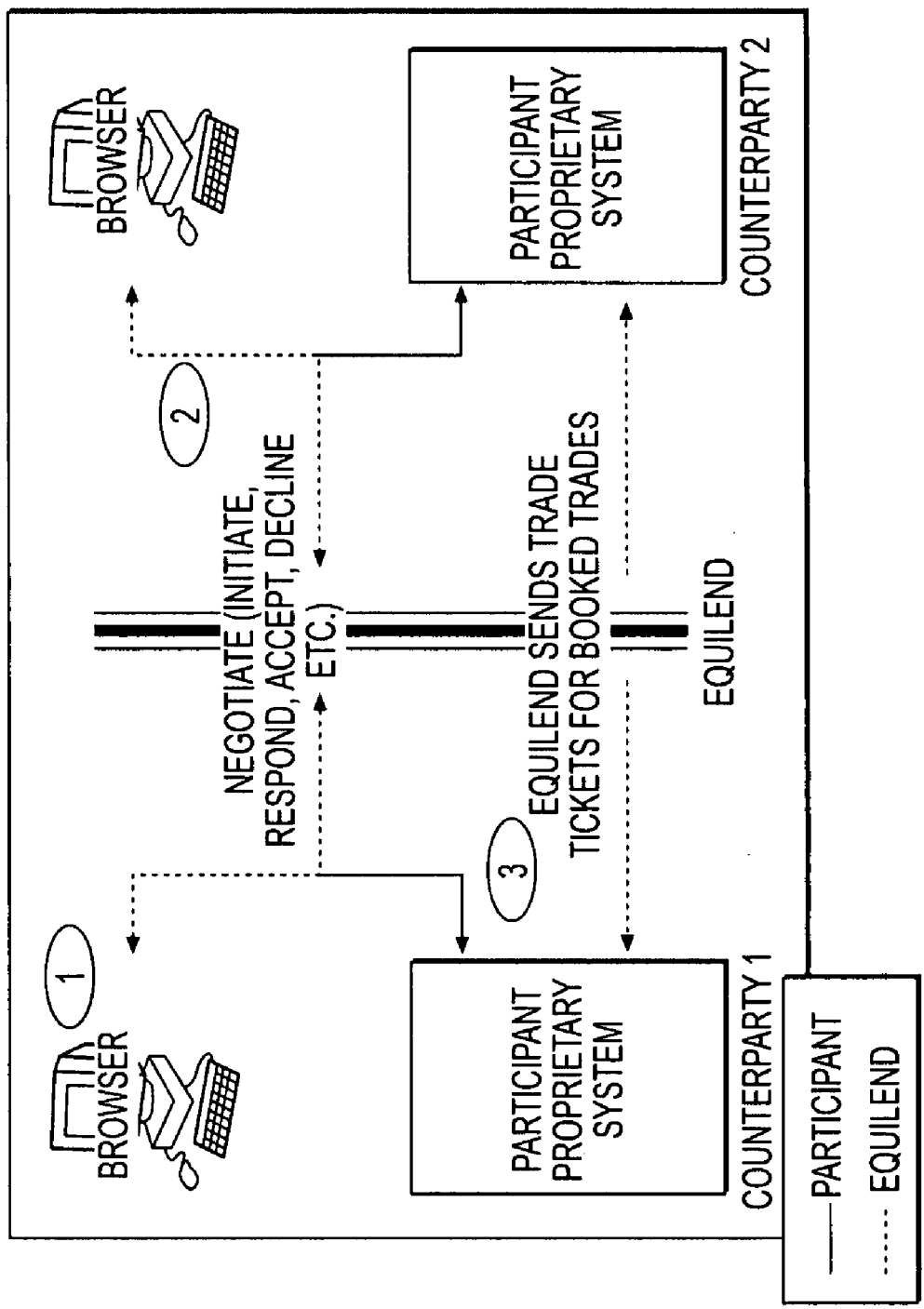
FIG. 4 shows an illustrative embodiment of parties engaging in one-to-one negotiations.

One aspect of the invention is the ability for users of the system to engage in one-to-one negotiations. When creating an order, a trader can choose to send the order to a single counterparty or to multiple counterparties. If the trader chooses to send the order to multiple counterparties, the system automatically generates a unique order with its own ID for each counterparty. Because the initiating trader must negotiate each order separately, this is referred to as Simultaneous one-to-one Negotiation. Recipients cannot see the orders sent to the other counterparties. However, if the initiator invokes Total Quality Management or enables Deal Disclosure when creating the order, then recipients can tell that an order is part of a Simultaneous one-to-one Negotiation from the following: 1) the system adds a message indicating a Simultaneous Negotiation to each recipient's Activity Monitor; and/or 2) on the Negotiation home page in the user's browser, the system adds a Simultaneous Negotiation icon to the row for the order. One to one negotiations are illustrated in FIG. 4. In a preferred embodiment of the invention, text messaging is supported between all parties, although the system is equally well-implemented when text messaging is available between limited parties (i.e., those accessing the system via a browser interface).

With the Total Quantity Management feature of the invention, the system manages the total quantity for all orders in the Simultaneous Negotiation. When the Deal Disclosure feature is enabled, counterparties who meet or exceed the terms of the original order will receive Deal Disclosure information for each accepted order.

Although all orders in a Simultaneous one-to-one Negotiation are unique, they will have the same "Simul Negot" ID. Thus, when viewing the Negotiation home page in the user's browser, the initiator can group orders in the same Simultaneous Negotiation by sorting by the Simul Negot ID.

Total Quantity Management is a feature of Simultaneous one-to-one Negotiation that prevents traders from over-committing securities to multiple counterparties. If a trader creates a firm order for multiple counterparties and enters a Total Max Quantity value that is less than the sum of the Max Quantity values for all counterparties, then the system will manage the total quantity for all orders in the Simultaneous Negotiation. This means that if one counterparty accepts an order that is part of the Simultaneous Negotiation, the system will automatically update the Max Quantity values in all remaining orders (as long as the total quantity being managed falls within the range defined by the original order). The system will only manage the total quantity if counterparties accept their orders directly after receiving them. If a counterparty negotiates or declines the order instead of accepting it, their quantity is no longer managed. Once the total quantity of accepted orders reaches Total Max Quantity, the system automatically cancels all remaining orders.

For example, suppose a trader wants to lend a maximum of 10,000 shares of a particular security. The trader creates a firm order for three counterparties, setting Total Max Quantity to 10,000 and setting Max Quantity to 10,000 for each of the three counterparties. If one counterparty accepts the order with a quantity of 4,000 shares, then the system automatically updates the other counterparties' orders, setting Max Quantity to 6,000. If a second counterparty accepts an order with a quantity of 6,000 shares, then the system automatically cancels the third counterparty's order.

Deal Disclosure is a feature of Simultaneous one-to-one Negotiation. Because the initiating trader negotiates each order in a Simultaneous Negotiation individually, the other counterparties do not know the terms of each other's offers during negotiation. However, if the initiator chooses to enable this feature, then counterparties who meet or exceed the terms of the original order will receive Deal Disclosure information for each accepted order when negotiation has ended for all of the orders. Deal disclosure details include the quantity, some price information (such as the dividend rate, rebate rate, fee, etc.), some collateral information, and some date information. Deal disclosure does not reveal which counterparties were involved in the Simultaneous Negotiation. Deal disclosure can only be enabled if the order is initiated as a soft order.

Figure 5:
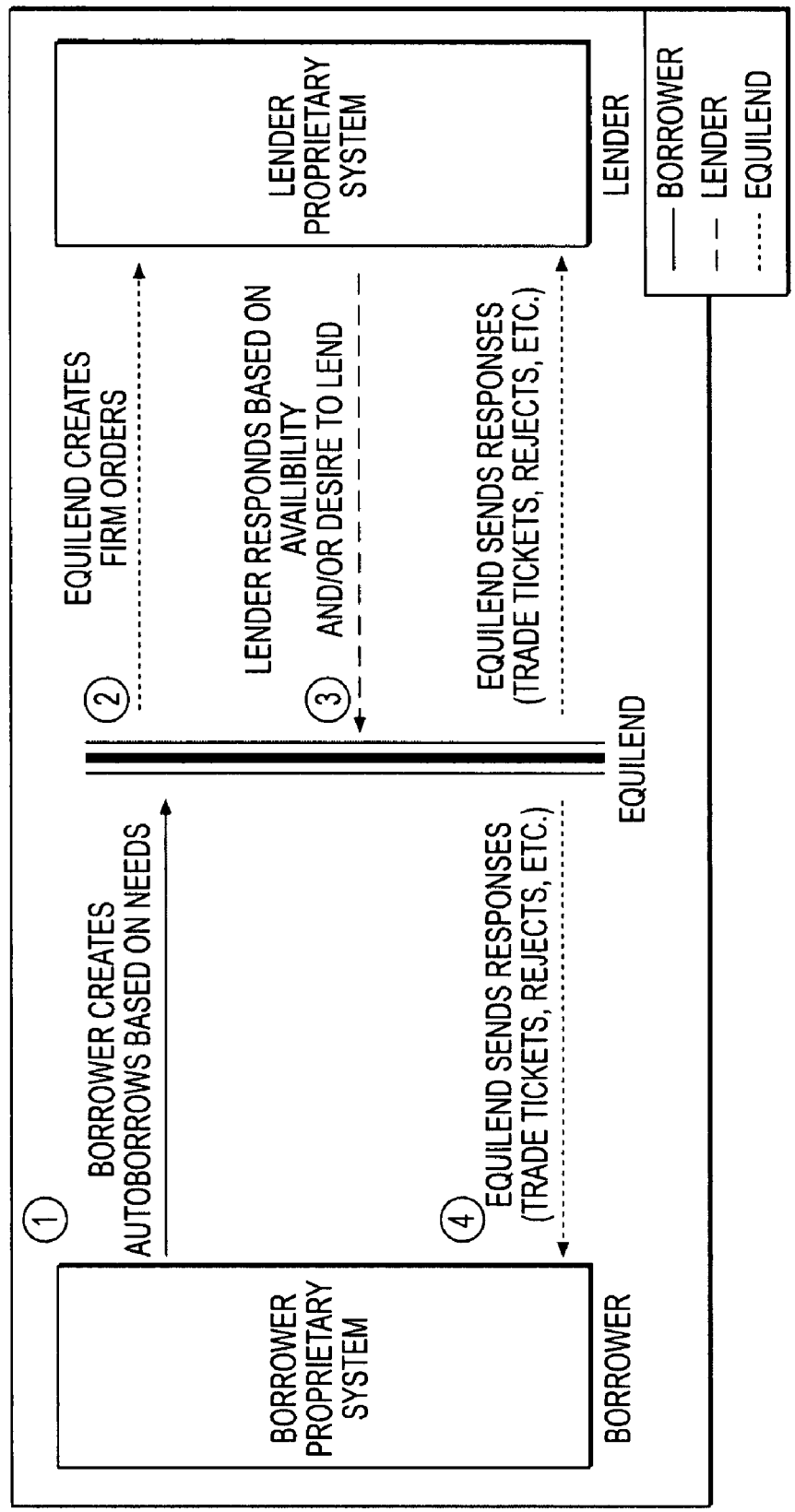
FIG. 5 shows an illustrative embodiment of the autoborrow feature of the present invention.

The autoborrow feature of the system permits participants to initiate orders that target all of their counterparties using a single messaging protocol. When a participant's internal system initiates an autoborrow request, the present system manages creation of firm orders based on bilaterally agreed schedule information and use of chaining rules. The lender may respond to orders (autoborrow requests) in several ways: the lender may accept, accept partially, reject with reason, etc., the order, based on loan availability and/or their desire to lend at the requested terms. An embodiment of the autoborrow process is illustrated in FIG. 5.

Chaining Rules can be used by the initiator of an Autoborrow transaction to specify the sequence and timing for sending Autoborrow Orders to multiple counterparties. Chaining Rules also specify which Autoborrow Schedule to use when generating an Autoborrow Order. Only the initiator of an Autoborrow transaction can set up and maintain Chaining Rules. Counterparties receiving Autoborrow Orders cannot tell whether the orders use Chaining Rules. Chaining rules also allow the initiator to specify different legal entities from their organization as the initiator of the order. This allows a single Autoborrow Record to be directed to counterparties from different legal entities within the initiator's organization. All Autoborrow Records in the same batch must use or not use Chaining Rules. When using Chaining Rules, each record can use a different Chaining Rule.

A unique feature of the system integrates the 'Autoborrow' and 'Negotiation' processes for the convenience of the participants. This feature allows the users to specify that certain Autoborrow Orders that are rejected be re-issued as One-to-One Orders with a different set of parameters than they had in the Autoborrow batch. These orders can be automatically generated and submitted by the system based on previously saved templates thus enabling the members to negotiate the terms on those rejected orders on a one-on-one basis with their counterparties.

Figure 6:
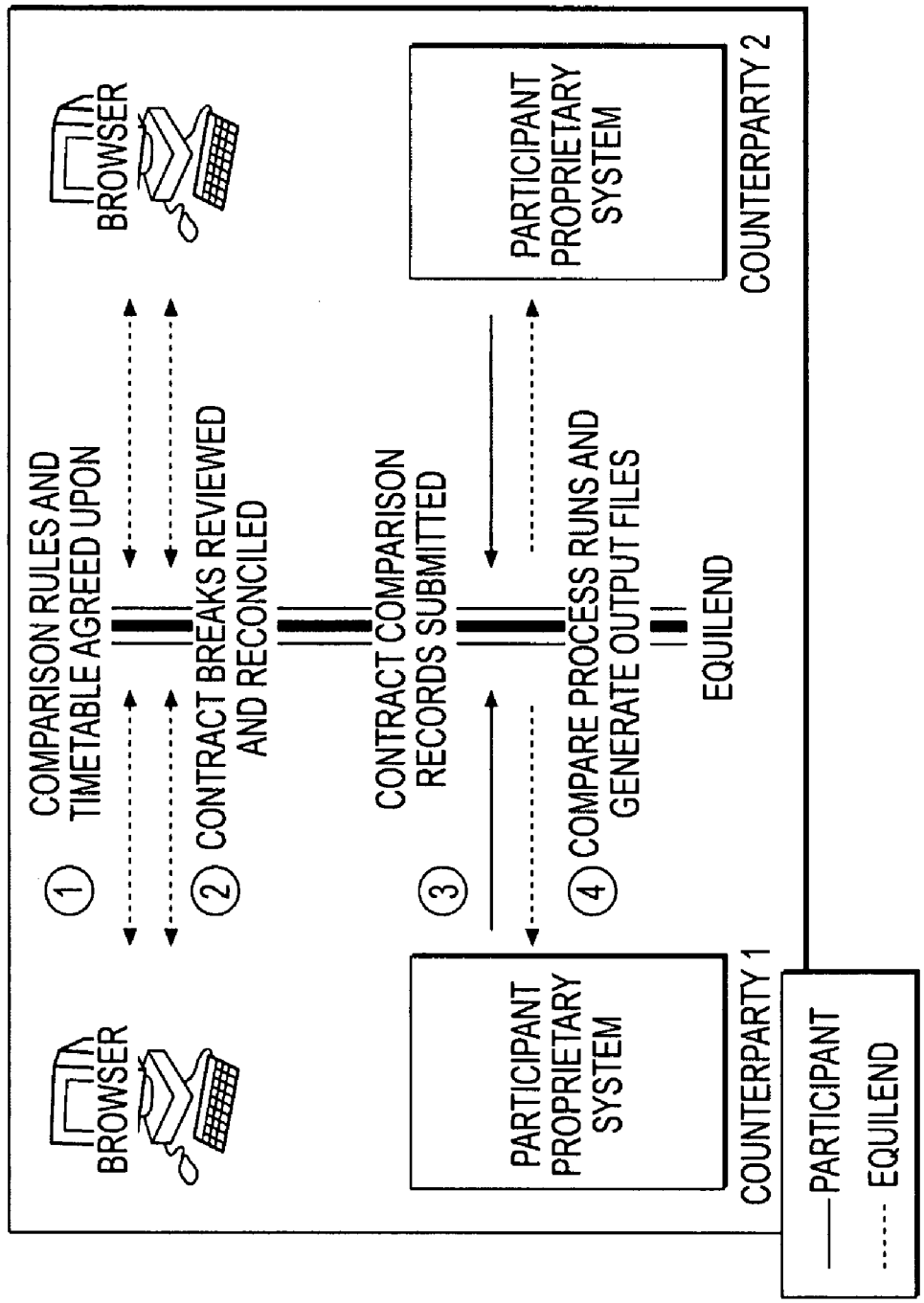
FIG. 6 shows an illustrative embodiment of the contract comparison feature of the present invention.

The present invention may also be provide contract comparison functionality. An exemplary illustration of the contract comparison process of the system is shown in FIG. 6. This feature of the invention permits counterparties to bilaterally agree on comparison criteria and file submission time. Each participant then files at the pre-determined time for comparison. The system runs the comparison and each participant receives a comparison report that includes any discrepancies between the contracts (e.g., broken records, matched records, unmatched records, etc.) The report may be sent to each participant in XML format which can be entered into their proprietary system, if desired. Each participant can view and reconcile any discrepancies, or breaks, via a browser, as well.

Figure 7:
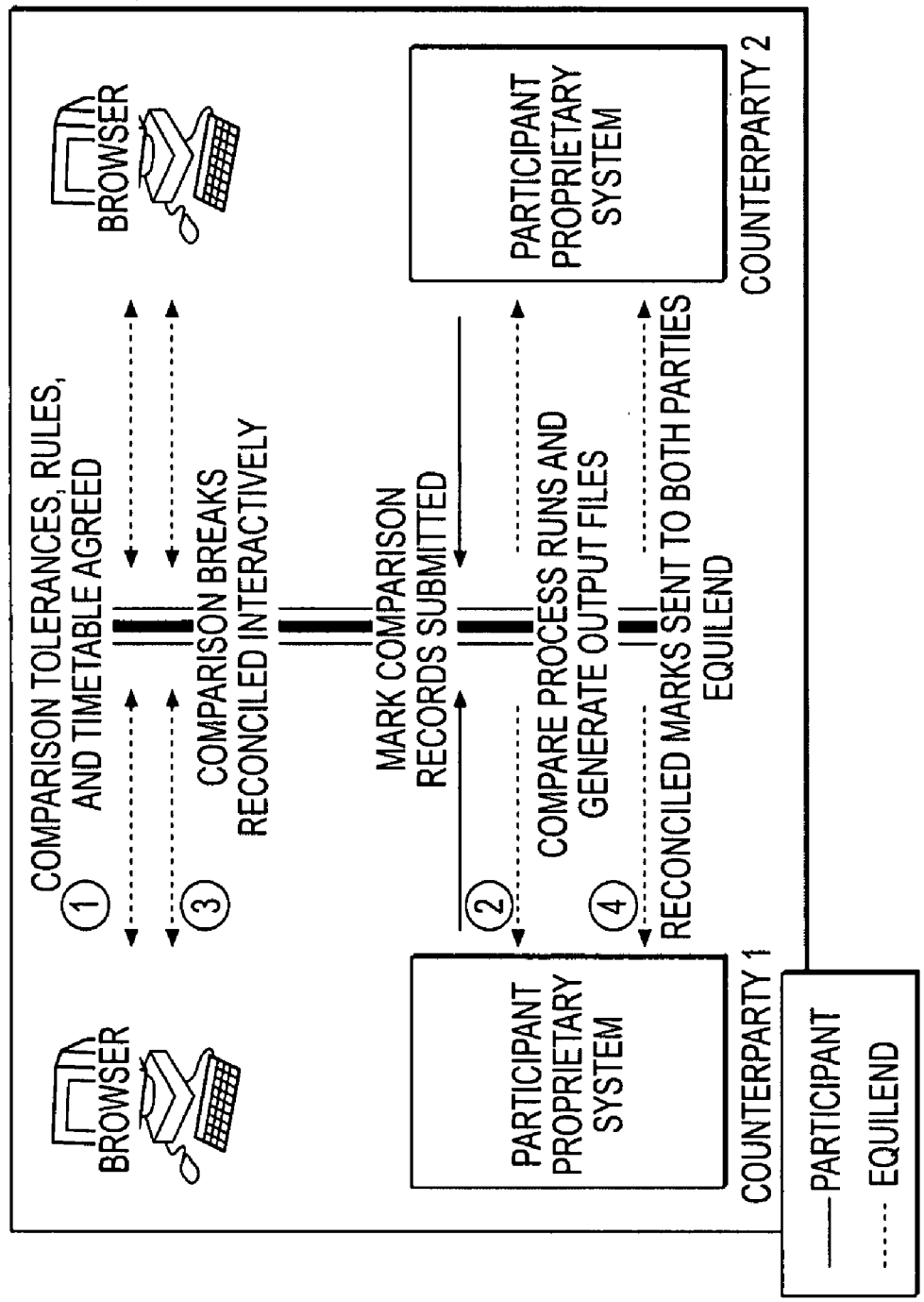
FIG. 7 shows an illustrative embodiment of mark to market comparison feature of the present invention.
Figure 8:
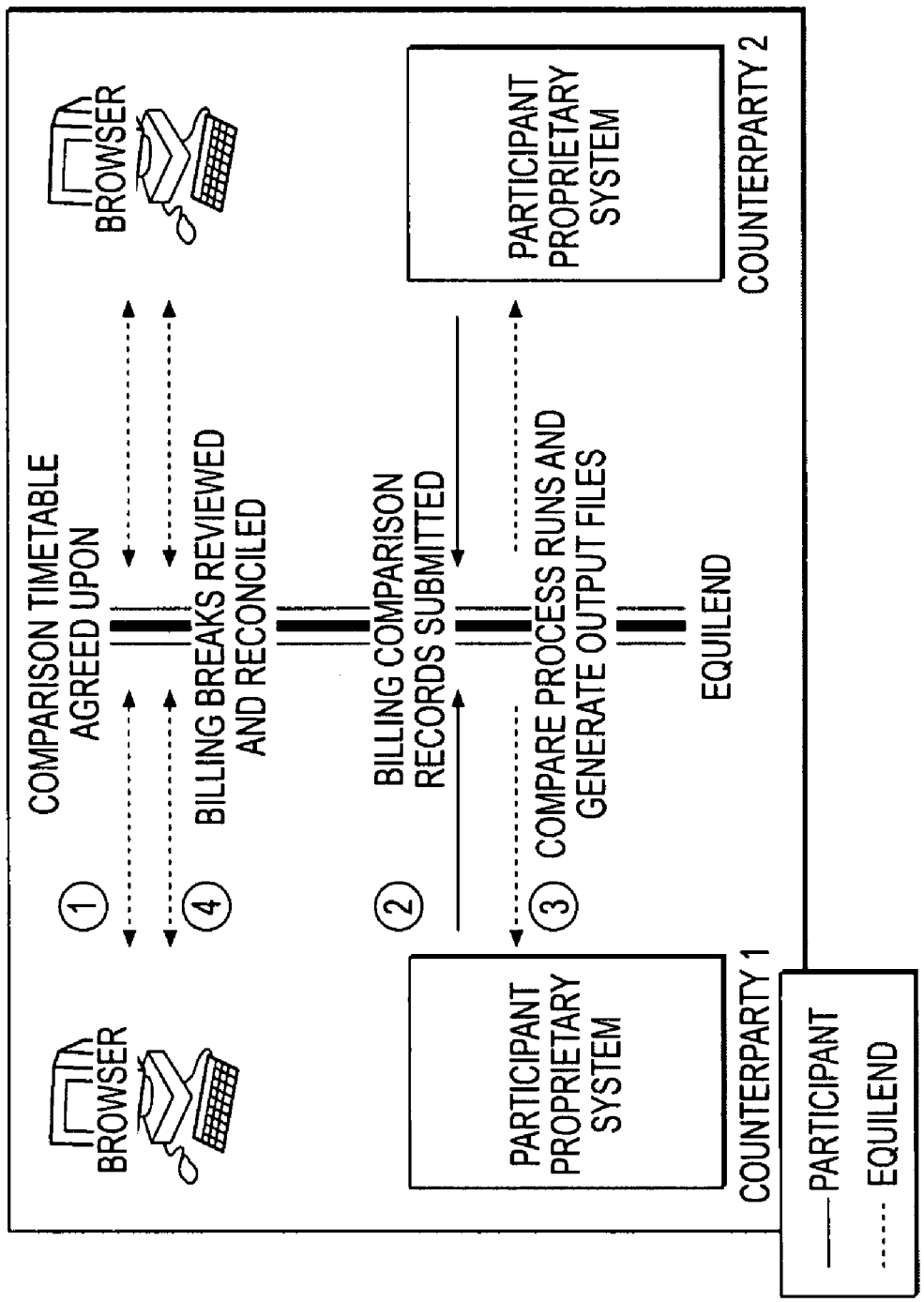
FIG. 8 shows an illustrative embodiment of the billing comparison feature of the present invention.

The present system may also provide mark-to-market comparisons, as illustrated in FIG. 7, and billing comparisons as illustrated in FIG. 8.

Figure 9:
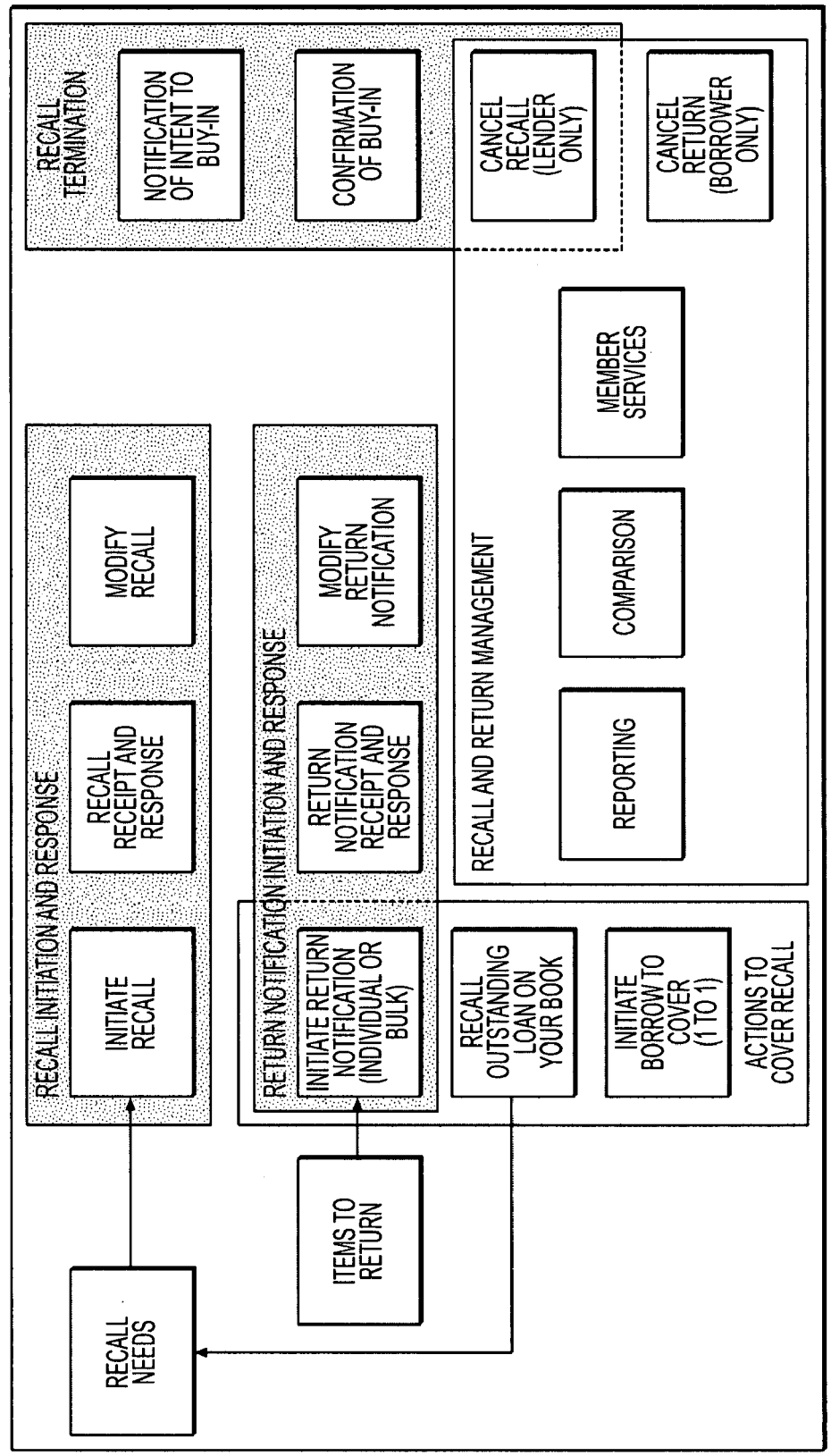
FIG. 9 shows an illustrative embodiment of the Return/Recall feature of the present invention.
Figure 10:
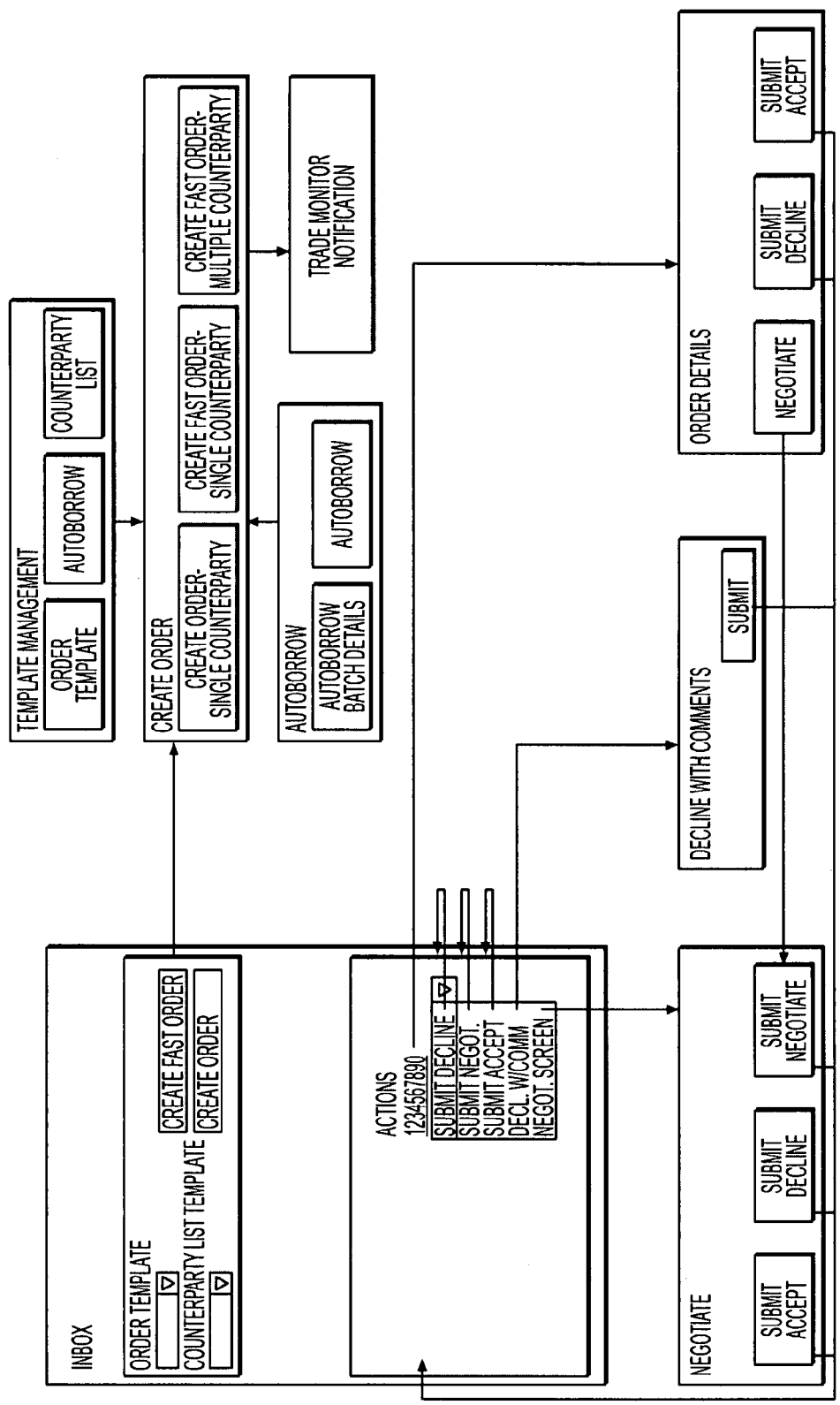
FIG. 10 shows an illustrative embodiment of the trading feature of the present invention.

FIG. 9 illustrates an exemplary embodiment of the return/recall aspect of the invention. A Loan Recall is the process through which a lender requests the return of securities from the borrower. The present system facilitates this process by providing several vehicles for a lender to recall stock from a borrower and tools for both lenders and borrowers to manage their recall flow until the process is complete.

For example, this system provides lenders with the ability to communicate loan recalls more efficiently via online notifications, minimizing failure to receive notification. Additionally, this functionality provides the opportunity to communicate with counterparts both on and off the present hub-based system Adopting the Securities Industry Association ("SIA") Automated Recall Management System ("ARMS") standard, which is employed in a preferred embodiment of the invention, will benefit all parties in a transaction according to the present invention, by providing one mechanism for Recall management for all participants. Linking Returns to Recalls can help minimize discrepancies between counterparties. Further, offering a single platform for counterparties to review contracts, recalls and returns, will provide a better audit trail that traces back throughout the lifecycle of a contract.

By way of illustration, the present invention may handle Recalls both for transactions originated within the securities trading system of the present invention and for transaction originated outside of the system. Recalls can be identified by a transaction identifier ("ID") when possible. The system will link loan returns to trades, loan recalls to trades, and returns to recalls, through the ID. An ID may be assigned to each transaction the system handles, not just those for which a recall/return is requested.

In most instances, IDs will be generated for loans made outside of the system during the contract comparison process. This process is critical for most effective use of Recall and Return functionality. Since Recalls result in the return of securities by the borrower, these returns are implicitly "tied" to the recall process. Functionality may exist for a borrower to Return against a specified Recall, and in this situation the Return is tied to the Recall through an system-issued Recall ID. Returns that are not initiated as a result of Recall will not generally be tied to any Recall ID.

It is assumed that a specific reason code will be allocated by the DTC for inclusion on return settlement for Returns which are the result of Recalls. The present system need not provide negotiation functionality for Recalls. Modifications of a Recall may be restricted to the lender, and in this case, the lender night only reduce the quantity of securities being recalled. Negotiations related to the terms of the Recall and discrepancy resolution must be handled outside of system. Once resolved, the lender may choose to cancel the existing Recall and send a new Recall notice with new Recall terms. If the quantity needs to be increased (e.g. due to a corporate action), the Lender should cancel the original Recall and initiate a new one.

Recalls can be rejected by the Borrower for a variety of reasons. Loan Recalls may not have expiration periods. The Recall will be considered outstanding until it is either satisfied by a return, cancelled by the lender, or a buy-in is issued against it.

The system may also support a holiday calendar for all markets where participants trade. All date calculations (including the Recall Effective Date and the Recall Due Date) may take holidays into considerations, and a date can be set for the next business day following a holiday. The holiday calendar data will be supplied by a leading vendor and maintained by automated processes and, where necessary, manually by the system's operators or other parties. Weekends should also be accounted for.

The system may also provide the ability to indicate Recalls vs. Termination Notices by allowing the initiator of a Recall to specify whether the Recall terminates the contract. When a Buy-In execution notice is sent for a partial amount against the Recall, the original Recall quantity is decremented by this partial amount, and the Recall is still valid for the balance.

Recalls may utilize a set of "states" which will be used throughout the lifecycle of the recall, from initiation, through actual receipt of the securities via the Return. These states are defined below, and can be used as the cornerstone upon which key functionality will be based:

Sent:

Recall notification has been issued by the lender, but has not been acknowledged by the borrower, and does require an Active acknowledgement by the borrower.

Only applicable in cases where active acknowledgement is being used. Recalls that are using the Passive acknowledgement model will not use this state.

Accepted:

A Recall notification that has been accepted by the borrower, indicating that they have received the Recall.

Recall notifications that use the passive acknowledgement model will move immediately into the Accepted state.

Recall notifications that use the active acknowledgement model require an Active acceptance to move into the Accepted state.

Rejected (With Reason Code):

A Recall notification that has been rejected by the borrower for one of the pre-defined reasons which the SIA has outlined. Recalls can be rejected for one of these reasons, although the system operator may choose to define additional parameters for the system to recognize as acceptable reasons.

Pending Return:

A Recall against which a Return(s) has been setup for the entire Recall quantity.

Closed:

A Recall that has had the requested securities returned using the system's Return functionality or another vehicle to initiate a return. The approach and methods that the system will use to determine when to close a Recall are outlined, as follows:

Cancelled:

A Recall that is cancelled by the lender. Once a Recall is cancelled, it cannot be accepted, rejected, or modified.

Bought-In:

If the lender does a buy-in for the securities, then the Recall will move to a state of brought-in.

For system participants using the Recall functionality, participants should compare Recall records nightly. This ensures that both counterparties have the same information regarding outstanding Recalls.

We claim:

1. A method for conducting securities transactions via a hub in electronic communication with a distributed network, the hub comprising a messaging tier for receiving requests from proprietary systems, a presentation tier for receiving requests sent via a browser, and an application tier for validating, processing, and satisfying requests received by the messaging tier and the presentation tier and for creating response messages, the method comprising:

receiving at the hub an order from a securities lender to lend an available number of shares of a particular security, broadcasting from the hub a notification of the order to a plurality of securities borrowers via the distributed network, the notification to each securities borrower including unique information for that securities borrower, receiving and sending requests via the hub whereby at least two borrowers engage in simultaneous negotiations for a loan of shares of the security from the lender, receiving at the hub responsive communications from the at least two of the plurality of borrowers, the responsive communications each indicating acceptance of the order for a portion of the available number of shares;

transmitting from the hub to the lender the responsive communications from the at least two of the plurality of securities borrowers, wherein the at least two borrowers separately enter into security lending transactions with the lender to borrow a portion of the available number of shares from the order of the particular security, and assigning a transaction identifier to each of the securities lending transactions, the transaction identifier enabling establishment of a link between securities loan returns and trades, between securities loan recalls and trades, and between securities loan returns and securities loan recalls, whereby the transaction identifier is associated with the securities lending transaction for an entire trade lifecycle;

wherein the step of assigning a transaction identifier is performed by the hub.

2. The method of claim 1, comprising making a second notification to the at least two borrowers via a distributed network that the borrowers are negotiating simultaneously.

3. The method of claim 1, comprising assigning a unique identifier to the securities lending transaction upon execution of the transaction.

4. The method of claim 1 wherein the unique information for each securities borrower includes a max quantity value indicating the total number of shares of the particular security available for lending to the securities borrower.

5. The method of claim 4 further comprising:

receiving from the lender a total max quantity value indicating the total number of shares of the particular security available for lending to the plurality of borrowers;

after a borrower accepts the order from the securities lender, updating the max quantity value for remaining borrowers to indicate the current total number of shares available for lending to the remaining borrowers.

6. The method of claim 5 further comprising sending a notification to the lender when the quantity of shares in the accepted orders reaches or exceeds the total max quantity value.

7. The method of claim 5 further comprising automatically cancelling all remaining orders once the quantity of accepted orders reaches the total max quantity value.

8. The method of claim 1 further comprising assigning a common simultaneous negotiation identifier to the orders sent to the plurality of securities borrowers.

9. A method for automatically borrowing securities via a hub in electronic communication with a distributed network, the hub comprising a messaging tier for receiving requests from proprietary systems, a presentation tier for receiving requests sent via a browser, and an application tier for validating, processing, and satisfying requests received by the messaging tier and the presentation tier and for creating response messages, the method comprising:

receiving at the hub via a first request from a borrower to borrow an available number of shares of a particular security, the first request comprising desired terms, processing the first request by the application tier of the hub to create an order in accordance with the desired terms and for the available number of shares, broadcasting from the hub a notification of the order to participating member firms via the distributed network, receiving and sending requests via the hub whereby at least two lenders engage in simultaneous negotiations for a loan of shares of the security to the borrower, receiving at the hub responsive communications from the at least two lenders, the responsive communications each indicating acceptance of the order for a portion of the available number of shares;

transmitting from the hub to the borrower the responsive communications from the at least two lenders in response to the order, wherein the at least two lenders separately enter into security lending transactions with the borrower for a portion of the available number of shares from the order of the particular security, and assigning a transaction identifier to each of the securities lending transactions, the transaction identifier enabling establishment of a link between securities loan returns and trades, between securities loan recalls and trades, and between securities loan returns and securities loan recalls, whereby the transaction identifier is associated with the securities lending transaction for an entire trade lifecycle;

wherein the step of assigning a transaction identifier is performed by the hub.

10. The method of claim 9, further comprising transmitting notification to the borrower and the at least two lenders.

11. The method of claim 10, wherein the notification comprises trade tickets.

12. The method of claim 9, wherein the broadcasted order to each participating member firm includes unique information associated with that member firm.

\* \* \* \* \*